US012748689B2

(12) United States Patent
Usukura

(10) Patent No.: US 12,748,689 B2
(45) Date of Patent: Sep. 29, 2026

(54) CONTROL DEVICE FOR TRANSITION BETWEEN NORMAL MODE AND POWER SAVING MODE

(71) Applicant: SEIKO EPSON CORPORATION, Tokyo (JP)

(72) Inventor: Satoshi Usukura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 19/002,601

(22) Filed: Dec. 26, 2024

(65) Prior Publication Data

US 2025/0217275 A1 Jul. 3, 2025

(30) Foreign Application Priority Data

Dec. 28, 2023 (JP) ................................ 2023-222297

(51) Int. Cl.
*G06F 12/02* (2006.01)

(52) U.S. Cl.
CPC ................................ *G06F 12/0223* (2013.01)

(58) Field of Classification Search
CPC .................................................. G06F 12/0223
See application file for complete search history.

(56) References Cited

U.S. PATENT DOCUMENTS 5,671,393 A * 9/1997 Yamaki .................. G06F 13/18 710/111
5,737,579 A * 4/1998 Kimura ................ G06F 13/105 703/27
8,068,376 B1 * 11/2011 Tran ...................... G11C 5/147 365/228
2003/0046463 A1 * 3/2003 Togo .................... G06F 13/364 710/241
2007/0061525 A1 * 3/2007 Hildebrand ......... G11C 11/4074 711/154
2014/0177349 A1 * 6/2014 Dreesen ............... G11C 11/417 365/189.05
2015/0177820 A1 * 6/2015 Kupermann .......... G06F 1/3206 713/323
2017/0052577 A1 * 2/2017 Kim ...................... G06F 9/4418
2019/0114118 A1 4/2019 Matsunaga
2019/0220228 A1 * 7/2019 Kim ...................... G06F 3/0605
2022/0113907 A1 * 4/2022 Kobayashi ............ G06F 3/0625
2023/0333627 A1 * 10/2023 Gao ...................... G06F 1/3225
2024/0061591 A1 * 2/2024 Cho ...................... G06F 1/3228
2024/0295973 A1 * 9/2024 Otsuka .................. G06F 3/0625
2025/0244818 A1 * 7/2025 Solomon ................ G11C 5/148

FOREIGN PATENT DOCUMENTS

JP 2019075775 5/2019

* cited by examiner

*Primary Examiner* — Ryan Bertram
(74) *Attorney, Agent, or Firm* — JCIPRNET

(57) ABSTRACT

A control device includes a first storage unit that requires no refreshing and has volatility, a first processor configured to access the first storage unit, a bus arbiter configured to arbitrate an access request from the first processor, and a first control circuit configured to perform mode control for the first storage unit based on the access request received from the first processor via the bus arbiter, wherein the first control circuit instructs, when a time period during which the access request is not received exceeds a predetermined time period in a state where the first storage unit is under a normal mode, the first storage unit to transition from the normal mode to a power saving mode.

7 Claims, 5 Drawing Sheets

CONTROL DEVICE FOR TRANSITION BETWEEN NORMAL MODE AND POWER SAVING MODE

The present application is based on, and claims priority from JP Application Serial Number 2023-222297, filed Dec. 28, 2023, the disclosure of which is hereby incorporated by reference herein in its entirety.

BACKGROUND

1. Technical Field

The present disclosure relates to a control device.

2. Related Art

A Static Random Access Memory (SRAM) having a normal mode and a power saving mode has been known as a volatile memory requiring no refreshing. JP-A-2019-75775 discloses a technique of switching, when data to be held by the SRAM is stored, an operation mode of the SRAM to the power saving mode under which power consumption is reduced in a state where the data is held.

With the known technique, a processor such as a central processing unit (CPU) determines whether the SRAM is accessed based on a current flowing through the SRAM, and thus a large processing load is imposed on the processor.

SUMMARY

A control device according to an aspect of the present disclosure includes a first storage unit that requires no refreshing and has volatility, a first processor configured to access the first storage unit, a bus arbiter configured to arbitrate an access request from the first processor, and a first control circuit configured to perform mode control for the first storage unit based on the access request received from the first processor via the bus arbiter, wherein the first control circuit instructs, when a time period during which the access request is not received exceeds a predetermined time period in a state where the first storage unit is under a normal mode, the first storage unit to transition from the normal mode to a power saving mode.

DESCRIPTION OF EMBODIMENTS

Embodiments of the present disclosure will be described below with reference to the drawings.

Figure 1:
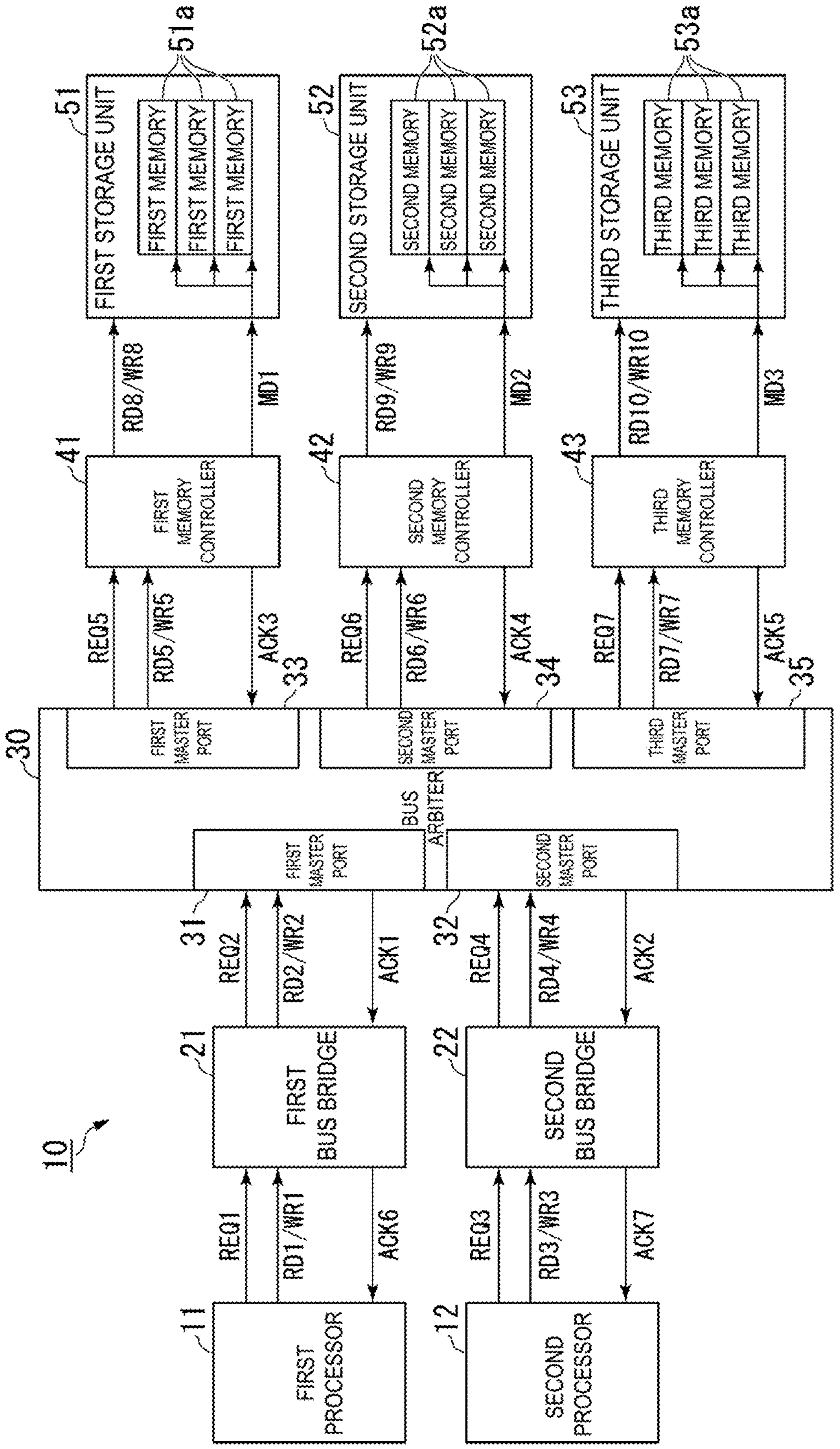
FIG. 1 is a block diagram illustrating a schematic configuration of a control device according to the present embodiment.

FIG. 1 is a block diagram illustrating a schematic configuration of a control device 10 according to the present embodiment. For example, the control device 10 is an integrated circuit (IC) chip mounted on an electronic device such as a global positioning system (GPS) receiver.

As illustrated in FIG. 1, the control device 10 includes a first processor 11, a second processor 12, a first bus bridge 21, a second bus bridge 22, a bus arbiter 30, a first memory controller 41, a second memory controller 42, a third memory controller 43, a first storage unit 51, a second storage unit 52, and a third storage unit 53.

The first storage unit 51 is a storage device that requires no refreshing and has volatility. For example, the first storage unit 51 is a memory bank including a plurality of first memories 51*a* that require no refreshing and have volatility. FIG. 1 illustrates the first storage unit 51 including three first memories 51*a* as an example, but the number of first memories 51*a* included in the first storage unit 51 is not limited to three. For example, each of the first memories 51*a* is an SRAM.

Each of the first memories 51*a* has operation modes including a normal mode and a sleep mode. The normal mode is a mode under which data can be written to a memory cell of the first memories 51*a*, or read from the memory cell. The sleep mode is a mode under which the power consumption of the first memory 51*a* is reduced in a state where the data written to the memory cell of the first memory 51*a* is held. When the first memory 51*a* is under the sleep mode, no data can be written to or read from the memory cell. The sleep mode is an example of a power saving mode.

A first mode switching signal MD1, output from the first memory controller 41, is input to the first storage unit 51. The first mode switching signal MD1 is input to each of the first memories 51*a* of the first storage unit 51. The operation mode of each of the first memories 51*a* is switched to one of the normal mode and the sleep mode based on the first mode switching signal MD1. For example, when the first mode switching signal MD1 is asserted, the operation mode of each of the first memories 51*a* is switched to the sleep mode. On the other hand, when the first mode switching signal MD1 is negated, the operation mode of each of the first memories 51*a* is switched to the normal mode.

In the present embodiment, "signal is asserted" means that the level of the signal is switched from a low level to a high level, and "signal is negated" means that the level of the signal is switched from a high level to a low level. Thus, in the present embodiment, a configuration in which the control device 10 is configured by an active-high logic circuit is described as an example. However, the control device 10 may be configured by an active-low logic circuit.

An eighth data read signal RD8 and an eighth data write signal WR8, output from the first memory controller 41, are input to the first storage unit 51. When the eighth data read signal RD8 is asserted in a state where each of the first memories 51*a* is under the normal mode, a state is achieved where data can be read from each of the first memories 51*a*. On the other hand, when the eighth data write signal WR8 is asserted in a state where each of the first memories 51*a* is under the normal mode, a state is achieved where data can be written to each of the first memories 51*a*.

The second storage unit 52 is a storage device that requires no refreshing and has volatility. For example, the second storage unit 52 is a memory bank including a plurality of second memories 52*a* that require no refreshing and have volatility. FIG. 1 illustrates the second storage unit 52 including three second memories 52*a* as an example, but the number of second memories 52*a* included in the second storage unit 52 is not limited to three. For example, each of the second memories 52*a* is an SRAM.

A second mode switching signal MD2, output from the second memory controller 42, is input to the second storage unit 52. The second mode switching signal MD2 is input to each of the second memories 52*a* of the second storage unit 52. The operation mode of each of the second memories 52*a* is switched to one of the normal mode and the sleep mode based on the second mode switching signal MD2. For example, when the second mode switching signal MD2 is asserted, the operation mode of each of the second memories 52*a* is switched to the sleep mode. On the other hand, when the second mode switching signal MD2 is negated, the operation mode of each of the second memories 52*a* is switched to the normal mode.

A ninth data read signal RD9 and a ninth data write signal WR9, output from the second memory controller 42, are input to the second storage unit 52. When the ninth data read signal RD9 is asserted in a state where each of the second memories 52*a* is under the normal mode, a state is achieved where data can be read from each of the second memories 52*a*. On the other hand, when the ninth data write signal WR9 is asserted in a state where each of the second memories 52*a* is under the normal mode, a state is achieved where data can be written to each of the second memories 52*a*.

The third storage unit 53 is a storage device that requires no refreshing and has volatility. For example, the third storage unit 53 is a memory bank including a plurality of third memories 53*a* that require no refreshing and have volatility. FIG. 1 illustrates the third storage unit 53 including three third memories 53*a* as an example, but the number of third memories 53*a* included in the third storage unit 53 is not limited to three. For example, each of the third memories 53*a* is an SRAM.

A third mode switching signal MD3, output from the third memory controller 43, is input to the third storage unit 53. The third mode switching signal MD3 is input to each of the third memories 53*a* of the third storage unit 53. The operation mode of each of the third memories 53*a* is switched to one of the normal mode and the sleep mode based on the third mode switching signal MD3. For example, when the third mode switching signal MD3 is asserted, the operation mode of each of the third memories 53*a* is switched to the sleep mode. On the other hand, when the third mode switching signal MD3 is negated, the operation mode of each of the third memories 53*a* is switched to the normal mode.

A tenth data read signal RD10 and a tenth data write signal WR10, output from the third memory controller 43, are input to the third storage unit 53. When the tenth data read signal RD10 is asserted in a state where each of the third memories 53*a* is under the normal mode, a state is achieved where data can be read from each of the third memories 53*a*. On the other hand, when the tenth data write signal WR10 is asserted in a state where each of the third memories 53*a* is under the normal mode, a state is achieved where data can be written to each of the third memories 53*a*.

The first processor 11 accesses one of the first storage unit 51, the second storage unit 52, and the third storage unit 53. The first processor 11 is, for example, a CPU. The first processor 11 communicates with the bus arbiter 30 via the first bus bridge 21. The first processor 11 outputs a first access request signal REQ1, a first data read signal RD1, and a first data write signal WR1 to the first bus bridge 21.

When issuing an access request, the first processor 11 asserts the first access request signal REQ1. When withdrawing the access request, the first processor 11 negates the first access request signal REQ1. The first processor 11 asserts the first data read signal RD1 when reading data from one of the first storage unit 51, the second storage unit 52, and the third storage unit 53. The first processor 11 asserts the first data write signal WR1 when writing data to one of the first storage unit 51, the second storage unit 52, and the third storage unit 53.

A sixth acknowledge signal ACK6 output from the first bus bridge 21 is input to the first processor 11. If the level of the sixth acknowledge signal ACK6 is low when the first access request signal REQ1 is asserted, the first processor 11 asserts the first data read signal RD1 or the first data write signal WR1. On the other hand, if the level of the sixth acknowledge signal ACK6 is high when the first access request signal REQ1 is asserted, the first processor 11 does not assert the first data read signal RD1 or the first data write signal WR1 until the sixth acknowledge signal ACK6 is negated. In other words, if the level of the sixth acknowledge signal ACK6 is high when an access request is issued, the first processor 11 stands by until the sixth acknowledge signal ACK6 is negated.

The first bus bridge 21 is coupled to a first master port 31 of the bus arbiter 30 and relays communication between the first processor 11 and the bus arbiter 30. Specifically, the first bus bridge 21 performs mutual conversion between a bus protocol of the first processor 11 and a bus protocol of the bus arbiter 30.

The first bus bridge 21 outputs a second access request signal REQ2, a second data read signal RD2, and a second data write signal WR2 to the bus arbiter 30. The first access request signal REQ1, the first data read signal RD1, and the first data write signal WR1 output from the first processor 11 are input to the first bus bridge 21. When the first access request signal REQ1 is asserted, the first bus bridge 21 asserts the second access request signal REQ2. When the first access request signal REQ1 is negated, the first bus bridge 21 negates the second access request signal REQ2.

When the first data read signal RD1 is asserted, the first bus bridge 21 asserts the second data read signal RD2. When the first data read signal RD1 is negated, the first bus bridge 21 negates the second data read signal RD2. When the first data write signal WR1 is asserted, the first bus bridge 21 asserts the second data write signal WR2. When the first data write signal WR1 is negated, the first bus bridge 21 negates the second data write signal WR2.

The first bus bridge 21 outputs the sixth acknowledge signal ACK6 to the first processor 11. A first acknowledge signal ACK1 output from the bus arbiter 30 is input to the first bus bridge 21. The first bus bridge 21 outputs a signal indicating the exclusive OR of the first access request signal REQ1 and the first acknowledge signal ACK1 as the sixth acknowledge signal ACK6.

The second processor 12 accesses one of the first storage unit 51, the second storage unit 52, and the third storage unit 53. The second processor 12 is, for example, a CPU. The second processor 12 communicates with the bus arbiter 30 via the second bus bridge 22. The second processor 12 outputs a third access request signal REQ3, a third data read signal RD3, and a third data write signal WR3 to the second bus bridge 22.

When issuing an access request, the second processor 12 asserts the third access request signal REQ3. When withdrawing the access request, the second processor 12 negates the third access request signal REQ3. The second processor 12 asserts the third data read signal RD3 when reading data from one of the first storage unit 51, the second storage unit 52, and the third storage unit 53. The second processor 12 asserts the third data write signal WR3 when writing data to one of the first storage unit 51, the second storage unit 52, and the third storage unit 53.

A seventh acknowledge signal ACK7 output from the second bus bridge 22 is input to the second processor 12. If the level of the seventh acknowledge signal ACK7 is low when the third access request signal REQ3 is asserted, the second processor 12 asserts the third data read signal RD3 or the third data write signal WR3. On the other hand, if the level of the seventh acknowledge signal ACK7 is high when the third access request signal REQ3 is asserted, the second processor 12 does not assert the third data read signal RD3 or the third data write signal WR3 until the seventh acknowledge signal ACK7 is negated. In other words, if the level of the seventh acknowledge signal ACK7 is high when an access request is issued, the second processor 12 stands by until the seventh acknowledge signal ACK7 is negated.

The second bus bridge 22 is coupled to a second master port 32 of the bus arbiter 30 and relays communication between the second processor 12 and the bus arbiter 30. Specifically, the second bus bridge 22 performs mutual conversion between a bus protocol of the second processor 12 and a bus protocol of the bus arbiter 30.

The second bus bridge 22 outputs a fourth access request signal REQ4, a fourth data read signal RD4, and a fourth data write signal WR4 to the bus arbiter 30. The third access request signal REQ3, the third data read signal RD3, and the third data write signal WR3 output from the second processor 12 are input to the second bus bridge 22. When the third access request signal REQ3 is asserted, the second bus bridge 22 asserts the fourth access request signal REQ4. When the third access request signal REQ3 is negated, the second bus bridge 22 negates the fourth access request signal REQ4.

When the third data read signal RD3 is asserted, the second bus bridge 22 asserts the fourth data read signal RD4. When the third data read signal RD3 is negated, the second bus bridge 22 negates the fourth data read signal RD4. When the third data write signal WR3 is asserted, the second bus bridge 22 asserts the fourth data write signal WR4. When the third data write signal WR3 is negated, the second bus bridge 22 negates the fourth data write signal WR4.

The second bus bridge 22 outputs the seventh acknowledge signal ACK7 to the second processor 12. A second acknowledge signal ACK2 output from the bus arbiter 30 is input to the second bus bridge 22. The second bus bridge 22 outputs a signal indicating the exclusive OR of the third access request signal REQ3 and the second acknowledge signal ACK2 as the seventh acknowledge signal ACK7.

The bus arbiter 30 arbitrates an access request from the first processor 11 and an access request from the second processor 12. The bus arbiter 30 outputs a fifth access request signal REQ5, a fifth data read signal RD5, and a fifth data write signal WR5 to the first memory controller 41. A third acknowledge signal ACK3 output from the first memory controller 41 is input to the bus arbiter 30.

When the first processor 11 requests access to the first storage unit 51 (first case), the bus arbiter 30 asserts the fifth access request signal REQ5 when the second access request signal REQ2 input from the first bus bridge 21 is asserted. In the first case, the bus arbiter 30 negates the fifth access request signal REQ5 when the second access request signal REQ2 is negated.

In the first case, the bus arbiter 30 asserts the fifth data read signal RD5 when the second data read signal RD2 input from the first bus bridge 21 is asserted. In the first case, the bus arbiter 30 negates the fifth data read signal RD5 when the second data read signal RD2 is negated. In the first case, the bus arbiter 30 asserts the fifth data write signal WR5 when the second data write signal WR2 input from the first bus bridge 21 is asserted. In the first case, the bus arbiter 30 negates the fifth data write signal WR5 when the second data write signal WR2 is negated.

The bus arbiter 30 outputs the first acknowledge signal ACK1 to the first bus bridge 21. In the first case, the bus arbiter 30 asserts the first acknowledge signal ACK1 when the third acknowledge signal ACK3 is asserted. In the first case, the bus arbiter 30 negates the first acknowledge signal ACK1 when the third acknowledge signal ACK3 is negated.

When the second processor 12 requests access to the first storage unit 51 (second case), the bus arbiter 30 asserts the fifth access request signal REQ5 when the fourth access request signal REQ4 input from the second bus bridge 22 is asserted. In the second case, the bus arbiter 30 negates the fifth access request signal REQ5 when the fourth access request signal REQ4 is negated.

In the second case, the bus arbiter 30 asserts the fifth data read signal RD5 when the fourth data read signal RD4 input from the second bus bridge 22 is asserted. In the second case, the bus arbiter 30 negates the fifth data read signal RD5 when the fourth data read signal RD4 is negated. In the second case, the bus arbiter 30 asserts the fifth data write signal WR5 when the fourth data write signal WR4 input from the second bus bridge 22 is asserted. In the second case, the bus arbiter 30 negates the fifth data write signal WR5 when the fourth data write signal WR4 is negated.

The bus arbiter 30 outputs the second acknowledge signal ACK2 to the second bus bridge 22. In the second case, the bus arbiter 30 asserts the second acknowledge signal ACK2 when the third acknowledge signal ACK3 is asserted. In the second case, the bus arbiter 30 negates the second acknowledge signal ACK2 when the third acknowledge signal ACK3 is negated.

The bus arbiter 30 outputs a sixth access request signal REQ6, a sixth data read signal RD6, and a sixth data write signal WR6 to the second memory controller 42. A fourth acknowledge signal ACK4 output from the second memory controller 42 is input to the bus arbiter 30.

When the first processor 11 requests access to the second storage unit 52 (third case), the bus arbiter 30 asserts the sixth access request signal REQ6 when the second access request signal REQ2 input from the first bus bridge 21 is asserted. In the third case, the bus arbiter 30 negates the sixth access request signal REQ6 when the second access request signal REQ2 is negated.

In the third case, the bus arbiter 30 asserts the sixth data read signal RD6 when the second data read signal RD2 input from the first bus bridge 21 is asserted. In the third case, the bus arbiter 30 negates the sixth data read signal RD6 when the second data read signal RD2 is negated. In the third case, the bus arbiter 30 asserts the sixth data write signal WR6 when the second data write signal WR2 input from the first bus bridge 21 is asserted. In the third case, the bus arbiter 30 negates the sixth data write signal WR6 when the second data write signal WR2 is negated.

In the third case, the bus arbiter 30 asserts the first acknowledge signal ACK1 when the fourth acknowledge signal ACK4 is asserted. In the third case, the bus arbiter 30 negates the first acknowledge signal ACK1 when the fourth acknowledge signal ACK4 is negated.

When the second processor 12 requests access to the second storage unit 52 (fourth case), the bus arbiter 30 asserts the sixth access request signal REQ6 when the fourth access request signal REQ4 input from the second bus bridge 22 is asserted. In the fourth case, the bus arbiter 30 negates the sixth access request signal REQ6 when the fourth access request signal REQ4 is negated.

In the fourth case, the bus arbiter 30 asserts the sixth data read signal RD6 when the fourth data read signal RD4 input from the second bus bridge 22 is asserted. In the fourth case, the bus arbiter 30 negates the sixth data read signal RD6 when the fourth data read signal RD4 is negated. In the fourth case, the bus arbiter 30 asserts the sixth data write signal WR6 when the fourth data write signal WR4 input from the second bus bridge 22 is asserted. In the fourth case, the bus arbiter 30 negates the sixth data write signal WR6 when the fourth data write signal WR4 is negated.

In the fourth case, the bus arbiter 30 asserts the second acknowledge signal ACK2 when the fourth acknowledge signal ACK4 is asserted. In the fourth case, the bus arbiter 30 negates the second acknowledge signal ACK2 when the fourth acknowledge signal ACK4 is negated.

The bus arbiter 30 outputs a seventh access request signal REQ7, a seventh data read signal RD7, and a seventh data write signal WR7 to the third memory controller 43. A fifth acknowledge signal ACK5 output from the third memory controller 43 is input to the bus arbiter 30.

When the first processor 11 requests access to the third storage unit 53 (fifth case), the bus arbiter 30 asserts the seventh access request signal REQ7 when the second access request signal REQ2 input from the first bus bridge 21 is asserted. In the fifth case, the bus arbiter 30 negates the seventh access request signal REQ7 when the second access request signal REQ2 is negated.

In the fifth case, the bus arbiter 30 asserts the seventh data read signal RD7 when the second data read signal RD2 input from the first bus bridge 21 is asserted. In the fifth case, the bus arbiter 30 negates the seventh data read signal RD7 when the second data read signal RD2 is negated. In the fifth case, the bus arbiter 30 asserts the seventh data write signal WR7 when the second data write signal WR2 input from the first bus bridge 21 is asserted. In the fifth case, the bus arbiter 30 negates the seventh data write signal WR7 when the second data write signal WR2 is negated.

In the fifth case, the bus arbiter 30 asserts the first acknowledge signal ACK1 when the fifth acknowledge signal ACK5 is asserted. In the fifth case, the bus arbiter 30 negates the first acknowledge signal ACK1 when the fifth acknowledge signal ACK5 is negated.

When the second processor 12 requests access to the third storage unit 53 (sixth case), the bus arbiter 30 asserts the seventh access request signal REQ7 when the fourth access request signal REQ4 input from the second bus bridge 22 is asserted. In the sixth case, the bus arbiter 30 negates the seventh access request signal REQ7 when the fourth access request signal REQ4 is negated.

In the sixth case, the bus arbiter 30 asserts the seventh data read signal RD7 when the fourth data read signal RD4 input from the second bus bridge 22 is asserted. In the sixth case, the bus arbiter 30 negates the seventh data read signal RD7 when the fourth data read signal RD4 is negated. In the sixth case, the bus arbiter 30 asserts the seventh data write signal WR7 when the fourth data write signal WR4 input from the second bus bridge 22 is asserted. In the sixth case, the bus arbiter 30 negates the seventh data write signal WR7 when the fourth data write signal WR4 is negated.

In the sixth case, the bus arbiter 30 asserts the second acknowledge signal ACK2 when the fifth acknowledge signal ACK5 is asserted. In the sixth case, the bus arbiter 30 negates the second acknowledge signal ACK2 when the fifth acknowledge signal ACK5 is negated.

The first memory controller 41 is coupled to a first slave port 33 of the bus arbiter 30. The fifth access request signal REQ5, the fifth data read signal RD5, and the fifth data write signal WR5 output from the bus arbiter 30 are input to the first memory controller 41. The first memory controller 41 outputs the third acknowledge signal ACK3 to the bus arbiter 30. The first memory controller 41 outputs the first mode switching signal MD1, the eighth data read signal RD8, and the eighth data write signal WR8 to the first storage unit 51.

The first memory controller 41 performs mode control for the first storage unit 51 based on an access request received from the first processor 11 or the second processor 12 via the bus arbiter 30. The first memory controller 41 is an example of a first control circuit and is configured by hardware.

For example, the first memory controller 41 instructs, when a time period during which the access request is not received exceeds a predetermined time period in a state where the first storage unit 51 is under the normal mode, the first storage unit 51 to transition from the normal mode to the sleep mode. The first memory controller 41 measures the time period during which the access request is not received. More specifically, the first memory controller 41 starts measuring the time period after the fifth access request signal REQ5 is negated in a state where the first storage unit 51 is under the normal mode, and asserts the first mode switching signal MD1 when the time period measured exceeds the predetermined time period without the fifth access request signal REQ5 being asserted.

Upon receiving an access request from the first processor 11 or the second processor 12 via the bus arbiter 30 in a state where the first storage unit 51 is under the sleep mode, the first memory controller 41 instructs the first storage unit 51 to transition from the sleep mode to the normal mode. More specifically, when the fifth access request signal REQ5 is asserted in a state where the first storage unit 51 is under the sleep mode, the first memory controller 41 negates the first mode switching signal MD1.

After the first storage unit 51 has transitioned to the sleep mode, the first memory controller 41 returns an acknowledgement for the access request from the first processor 11 to the first bus bridge 21 via the bus arbiter 30. More specifically, the first memory controller 41 asserts the third acknowledge signal ACK3 after the first storage unit 51 has transitioned to the sleep mode. When an access request is issued from the first processor 11 and the third acknowledge signal ACK3 is asserted, the bus arbiter 30 asserts the first acknowledge signal ACK1.

In addition, after the first storage unit 51 has transitioned to the sleep mode, the first memory controller 41 returns an acknowledgement for the access request from the second processor 12 to the second bus bridge 22 via the bus arbiter 30. More specifically, the first memory controller 41 asserts the third acknowledge signal ACK3 after the first storage unit 51 has transitioned to the sleep mode. When the access request is issued from the second processor 12 and the third acknowledge signal ACK3 is asserted, the bus arbiter 30 asserts the second acknowledge signal ACK2.

When the first storage unit 51 is under the normal mode, the first memory controller 41 asserts the eighth data read signal RD8 when the fifth data read signal RD5 is asserted. When the first storage unit 51 is under the normal mode, the first memory controller 41 negates the eighth data read signal RD8 when the fifth data read signal RD5 is negated.

When the first storage unit 51 is under the normal mode, the first memory controller 41 asserts the eighth data write signal WR8 when the fifth data write signal WR5 is asserted. When the first storage unit 51 is under the normal mode, the first memory controller 41 negates the eighth data write signal WR8 when the fifth data write signal WR5 is negated.

The second memory controller 42 is coupled to a second slave port 34 of the bus arbiter 30. The sixth access request signal REQ6, the sixth data read signal RD6, and the sixth data write signal WR6 output from the bus arbiter 30 are input to the second memory controller 42. The second memory controller 42 outputs the fourth acknowledge signal ACK4 to the bus arbiter 30. The second memory controller 42 outputs the second mode switching signal MD2, the ninth data read signal RD9, and the ninth data write signal WR9 to the second storage unit 52.

The second memory controller 42 performs mode control for the second storage unit 52 based on an access request received from the first processor 11 or the second processor 12 via the bus arbiter 30. The second memory controller 42 is an example of a second control circuit and is configured by hardware.

For example, the second memory controller 42 instructs, when a time period during which the access request is not received exceeds a predetermined time period in a state where the second storage unit 52 is under the normal mode, the second storage unit 52 to transition from the normal mode to the sleep mode. The second memory controller 42 measures the time period during which the access request is not received. More specifically, the second memory controller 42 starts measuring the time period after the sixth access request signal REQ6 is negated in a state where the second storage unit 52 is under the normal mode, and asserts the second mode switching signal MD2 when the time period measured exceeds the predetermined time period without the sixth access request signal REQ6 being asserted.

Upon receiving an access request from the first processor 11 or the second processor 12 via the bus arbiter 30 in a state where the second storage unit 52 is under the sleep mode, the second memory controller 42 instructs the second storage unit 52 to transition from the sleep mode to the normal mode. More specifically, when the sixth access request signal REQ6 is asserted in a state where the second storage unit 52 is under the sleep mode, the second memory controller 42 negates the second mode switching signal MD2.

After the second storage unit 52 has transitioned to the sleep mode, the second memory controller 42 returns an acknowledgement for the access request from the first processor 11 to the first bus bridge 21 via the bus arbiter 30. More specifically, the second memory controller 42 asserts the fourth acknowledge signal ACK4 after the second storage unit 52 has transitioned to the sleep mode. When the access request is issued from the first processor 11 and the fourth acknowledge signal ACK4 is asserted, the bus arbiter 30 asserts the first acknowledge signal ACK1.

In addition, after the second storage unit 52 has transitioned to the sleep mode, the second memory controller 42 returns an acknowledgement for the access request from the second processor 12 to the second bus bridge 22 via the bus arbiter 30. More specifically, the second memory controller 42 asserts the fourth acknowledge signal ACK4 after the second storage unit 52 has transitioned to the sleep mode. When the access request is issued from the second processor 12 and the fourth acknowledge signal ACK4 is asserted, the bus arbiter 30 asserts the second acknowledge ACK2.

When the second storage unit 52 is under the normal mode, the second memory controller 42 asserts the ninth data read signal RD9 when the sixth data read signal RD6 is asserted. When the second storage unit 52 is under the normal mode, the second memory controller 42 negates the ninth data read signal RD9 when the sixth data read signal RD6 is negated.

When the second storage unit 52 is under the normal mode, the second memory controller 42 asserts the ninth data write signal WR9 when the sixth data write signal WR6 is asserted. When the second storage unit 52 is under the normal mode, the second memory controller 42 negates the ninth data write signal WR9 when the sixth data write signal WR6 is negated.

The third memory controller 43 is coupled to a third slave port 35 of the bus arbiter 30. The seventh access request signal REQ7, the seventh data read signal RD7, and the seventh data write signal WR7 output from the bus arbiter 30 are input to the third memory controller 43. The third memory controller 43 outputs the fifth acknowledge signal ACK5 to the bus arbiter 30. The third memory controller 43 outputs the third mode switching signal MD3, the tenth data read signal RD10, and the tenth data write signal WR10 to the third storage unit 53.

The third memory controller 43 performs mode control for the third storage unit 53 based on an access request received from the first processor 11 or the second processor 12 via the bus arbiter 30. The third memory controller 43 is configured by hardware.

For example, the third memory controller 43 instructs, when a time period during which the access request is not received exceeds a predetermined time period in a state where the third storage unit 53 is under the normal mode, the third storage unit 53 to transition from the normal mode to the sleep mode. The third memory controller 43 measures the time period during which the access request is not received. More specifically, the third memory controller 43 starts measuring the time period after the seventh access request signal REQ7 is negated in a state where the third storage unit 53 is under the normal mode, and asserts the third mode switching signal MD3 when the time period measured exceeds the predetermined time period without the seventh access request signal REQ7 being asserted.

Upon receiving an access request from the first processor 11 or the second processor 12 via the bus arbiter 30 in a state where the third storage unit 53 is under the sleep mode, the third memory controller 43 instructs the third storage unit 53 to transition from the sleep mode to the normal mode. More specifically, when the seventh access request signal REQ7 is asserted in a state where the third storage unit 53 is under the sleep mode, the third memory controller 43 negates the third mode switching signal MD3.

After the third storage unit 53 has transitioned to the sleep mode, the third memory controller 43 returns an acknowledgement for the access request from the first processor 11 to the first bus bridge 21 via the bus arbiter 30. More specifically, the third memory controller 43 asserts the fifth acknowledge signal ACK5 after the third storage unit 53 has transitioned to the sleep mode. When the access request is issued from the first processor 11 and the fifth acknowledge signal ACK5 is asserted, the bus arbiter 30 asserts the first acknowledge signal ACK1.

In addition, after the third storage unit 53 has transitioned to the sleep mode, the third memory controller 43 returns an acknowledgement for the access request from the second processor 12 to the second bus bridge 22 via the bus arbiter 30. More specifically, the third memory controller 43 asserts the fifth acknowledge signal ACK5 after the third storage unit 53 has transitioned to the sleep mode. When the access request is issued from the second processor 12 and the fifth acknowledge signal ACK5 is asserted, the bus arbiter 30 asserts the second acknowledge ACK2.

When the third storage unit 53 is under the normal mode, the third memory controller 43 asserts the tenth data read signal RD10 when the seventh data read signal RD7 is asserted. When the third storage unit 53 is under the normal mode, the third memory controller 43 negates the tenth data read signal RD10 when the seventh data read signal RD7 is negated.

When the third storage unit 53 is under the normal mode, the third memory controller 43 asserts the tenth data write signal WR10 when the seventh data write signal WR7 is asserted. When the third storage unit 53 is under the normal mode, the third memory controller 43 negates the tenth data write signal WR10 when the seventh data write signal WR7 is negated.

The configuration of the control device 10 is as described above. Hereinafter, an operation of the control device 10 will be described with reference to FIG. 2 and FIG. 3.

Figure 2:
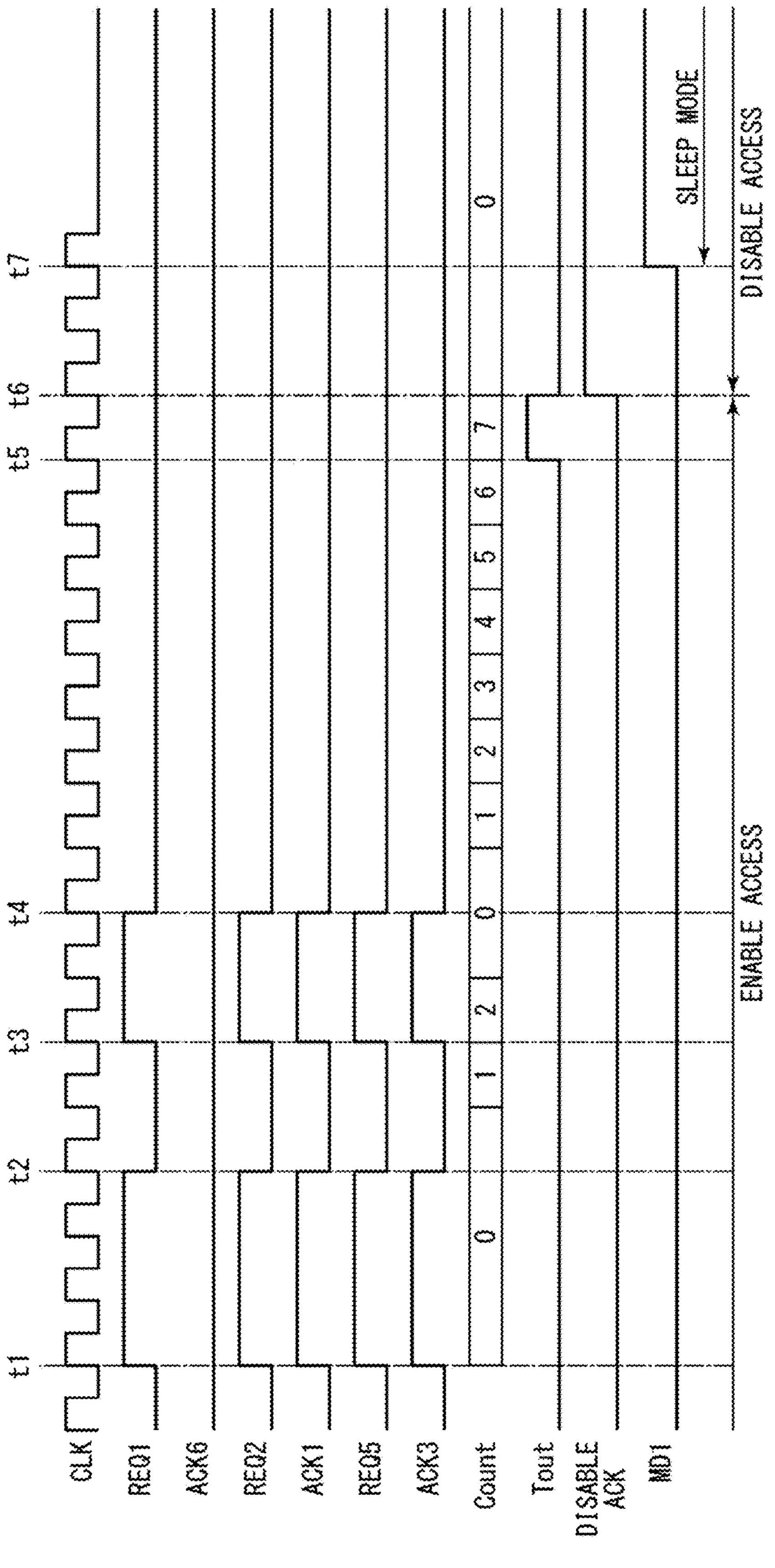
FIG. 2 is a first timing chart illustrating an example of an operation performed by the control device when a first processor requests access to a first storage unit.

FIG. 2 is a first timing chart illustrating an example of an operation performed by the control device 10 in the first case, that is, when the first processor 11 requests access to the first storage unit 51. FIG. 2 illustrates an example of waveforms of the first access request signal REQ1, the sixth acknowledge signal ACK6, the second access request signal REQ2, the first acknowledge signal ACK1, the fifth access request signal REQ5, the third acknowledge signal ACK3, and the first mode switching signal MD1 before and after the operation mode of the first storage unit 51 is switched from the normal mode to the sleep mode.

In FIG. 2, "CLK" indicates a clock signal used in the control device 10. In FIG. 2, "Count" indicates a count value of a timer (not illustrated) incorporated in the first memory controller 41. In FIG. 2, "Tout" indicates an output signal of the timer incorporated in the first memory controller 41.

In FIG. 2, "DISABLE ACK" is understood as a signal indicating a period during which the returning of the acknowledgement in response to an access request is disabled. Specifically, during a period in which "DISABLE ACK" is at a high level, the first memory controller 41 does not assert the third acknowledge signal ACK3 even if the fifth access request signal REQ5 is asserted. Note that "DISABLE ACK" is not an input/output signal of the first memory controller 41.

As illustrated in FIG. 2, in a period before a time point t1, the first access request signal REQ1, the sixth acknowledge signal ACK6, the second access request signal REQ2, the first acknowledge signal ACK1, the fifth access request signal REQ5, the third acknowledge signal ACK3, the first mode switching signal MD1, the timer output signal Tout, and "DISABLE ACK" are all at low level. Since the level of the first mode switching signal MD1 is low, the first storage unit 51 is under the normal mode.

At the time point t1, the first processor 11 asserts the first access request signal REQ1. Specifically, at the time point t1, the first processor 11 switches the level of the first access request signal REQ1 from the low level to the high level. In other words, at the time point t1, the first processor 11 issues an access request.

In this case, at the time point t1, the first bus bridge 21 asserts the second access request signal REQ2 in synchronization with the first access request signal REQ1. At the time point t1, the bus arbiter 30 asserts the fifth access request signal REQ5 in synchronization with the second access request signal REQ2.

At the time point t1, since the level of "DISABLE ACK" is low, the first memory controller 41 asserts the third acknowledge signal ACK3. In this case, at the time point t1, the bus arbiter 30 asserts the first acknowledge signal ACK1 in synchronization with the third acknowledge signal ACK3. At the time point t1, the first bus bridge 21 outputs a signal indicating the exclusive OR of the first access request signal REQ1 and the first acknowledge signal ACK1 as the sixth acknowledge signal ACK6. Thus, at the time point t1, the level of the sixth acknowledge signal ACK6 remains at the low level.

Subsequently, at a time point t2, the first processor 11 negates the first access request signal REQ1. Specifically, at the time point t2, the first processor 11 switches the level of the first access request signal REQ1 from the high level to the low level. Thus, at the time point t2, the first processor 11 withdraws the access request.

In this case, at the time point t2, the first bus bridge 21 negates the second access request signal REQ2 in synchronization with the first access request signal REQ1. At the time point t2, the bus arbiter 30 negates the fifth access request signal REQ5 in synchronization with the second access request signal REQ2.

At the time point t2, the first memory controller 41 negates the third acknowledge signal ACK3. In this case, at the time point t2, the bus arbiter 30 negates the first acknowledge signal ACK1 in synchronization with the third acknowledge signal ACK3. At the time point t2, the first bus bridge 21 outputs a signal indicating the exclusive OR of the first access request signal REQ1 and the first acknowledge signal ACK1 as the sixth acknowledge signal ACK6. Thus, at the time point t2, the level of the sixth acknowledge signal ACK6 remains at the low level.

When the fifth access request signal REQ5 is negated at the time point t2, the first memory controller 41 causes the timer to start a count operation. In other words, when the access request disappears, the first memory controller 41 causes the timer to start the count operation. The timer counts up the count value Count in synchronization with the rising edge of the clock signal CLK.

Subsequently, at a time point t3, the first processor 11 asserts the first access request signal REQ1 again. Specifically, at the time point t3, the first processor 11 switches the level of the first access request signal REQ1 from the low level to the high level. In other words, at the time point t3, the first processor 11 issues the access request again.

In this case, at the time point t3, the first bus bridge 21 asserts the second access request signal REQ2 in synchronization with the first access request signal REQ1. At the time point t3, the bus arbiter 30 asserts the fifth access request signal REQ5 in synchronization with the second access request signal REQ2.

At the time point t3, since the level of "DISABLE ACK" is low, the first memory controller 41 asserts the third acknowledge signal ACK3. In this case, at the time point t3, the bus arbiter 30 asserts the first acknowledge signal ACK1 in synchronization with the third acknowledge signal ACK3. At the time point t3, the first bus bridge 21 outputs a signal indicating the exclusive OR of the first access request signal REQ1 and the first acknowledge signal ACK1 as the sixth acknowledge signal ACK6. Thus, at the time point t3, the level of the sixth acknowledge signal ACK6 remains at the low level.

The count value Count of the timer is counted up to "2" in synchronization with the rising edge of the clock signal CLK generated at the time point t3. However, since the fifth access request signal REQ5 is asserted at the time point t3, the first memory controller 41 resets the count value Count of the timer to "0" in synchronization with the rising edge of the clock signal CLK generated immediately after the time point t3. Thus, when the access request is received during the count operation by the timer, the first memory controller 41 resets the count value Count of the timer to "0".

Subsequently, at a time point t4, the first processor 11 negates the first access request signal REQ1. Specifically, at the time point t4, the first processor 11 switches the level of the first access request signal REQ1 from the high level to the low level. Thus, at the time point t4, the first processor 11 withdraws the access request.

In this case, at the time point t4, the first bus bridge 21 negates the second access request signal REQ2 in synchronization with the first access request signal REQ1. At the time point t4, the bus arbiter 30 negates the fifth access request signal REQ5 in synchronization with the second access request signal REQ2.

At the time point t4, the first memory controller 41 negates the third acknowledge signal ACK3. In this case, at the time point t4, the bus arbiter 30 negates the first acknowledge signal ACK1 in synchronization with the third acknowledge signal ACK3. At the time point t4, the first bus bridge 21 outputs a signal indicating the exclusive OR of the first access request signal REQ1 and the first acknowledge signal ACK1 as the sixth acknowledge signal ACK6. Thus, at the time point t4, the level of the sixth acknowledge signal ACK6 remains at the low level.

When the fifth access request signal REQ5 is negated, that is, when the access request disappears at the time point t4, the first memory controller 41 causes the timer to start a count operation. After the time point t4, the timer counts up the count value Count in synchronization with the rising edge of the clock signal CLK.

After the time point t4, the first processor 11 does not assert the first access request signal REQ1. In this case, the count value Count of the timer is counted up to "7" at a time point t5 after a predetermined time period has elapsed from the time point t4. As described above, when the count value Count of the timer is counted up to "7" at the time point t5, the output signal Tout from the timer is asserted.

The first memory controller 41 resets the count value Count of the timer to "0" in synchronization with the rising edge of the clock signal CLK generated at a time point t6 immediately after the time point t5. As a result, the output signal Tout from the timer is negated at the time point t6. When the output signal Tout from the timer is negated at the time point t6, the level of "DISABLE ACK" is switched from the low level to the high level.

The first memory controller 41 asserts the first mode switching signal MD1 at a time point t7 after a certain period of time from the time point t6. For example, when the first memory 51*a* of the first storage unit 51 is an SRAM, several sequences may be executed to switch the first memory 51*a* from the normal mode to the sleep mode. The period from the time point t6 to the time point t7 is a period in which the above-described sequences are executed. After the time point t7, the operation mode of each of the first memories 51*a* of the first storage unit 51 is the sleep mode. Note that a period before the time point t6 is a period in which the first storage unit 51 is accessible, and a period after the time point t6 is a period in which the first storage unit 51 is inaccessible.

As described above, the first memory controller 41 instructs, when a time period during which the access request is not received exceeds a predetermined time period in a state where the first storage unit 51 is under the normal mode, the first storage unit 51 to transition from the normal mode to the sleep mode. More specifically, the first memory controller 41 starts measuring the time period after the fifth access request signal REQ5 is negated in a state where the first storage unit 51 is under the normal mode, and asserts the first mode switching signal MD1 when the time period measured exceeds the predetermined time period without the fifth access request signal REQ5 being asserted.

In the present embodiment, the first memory controller 41 asserts the first mode switching signal MD1 after the elapse of the time period from the point when the fifth access request signal REQ5 is negated to the point when the count value Count of the timer is counted up to "7". As described above, in the present embodiment, the maximum value of the count value Count of the timer is set to "7", but the maximum value of the count value Count may be appropriately changed. By adjusting the maximum value of the count value Count, it is possible to adjust the predetermined time period from the point when the access request disappears to the point when the transition of the first storage unit 51 to the sleep mode occurs.

Figure 3:
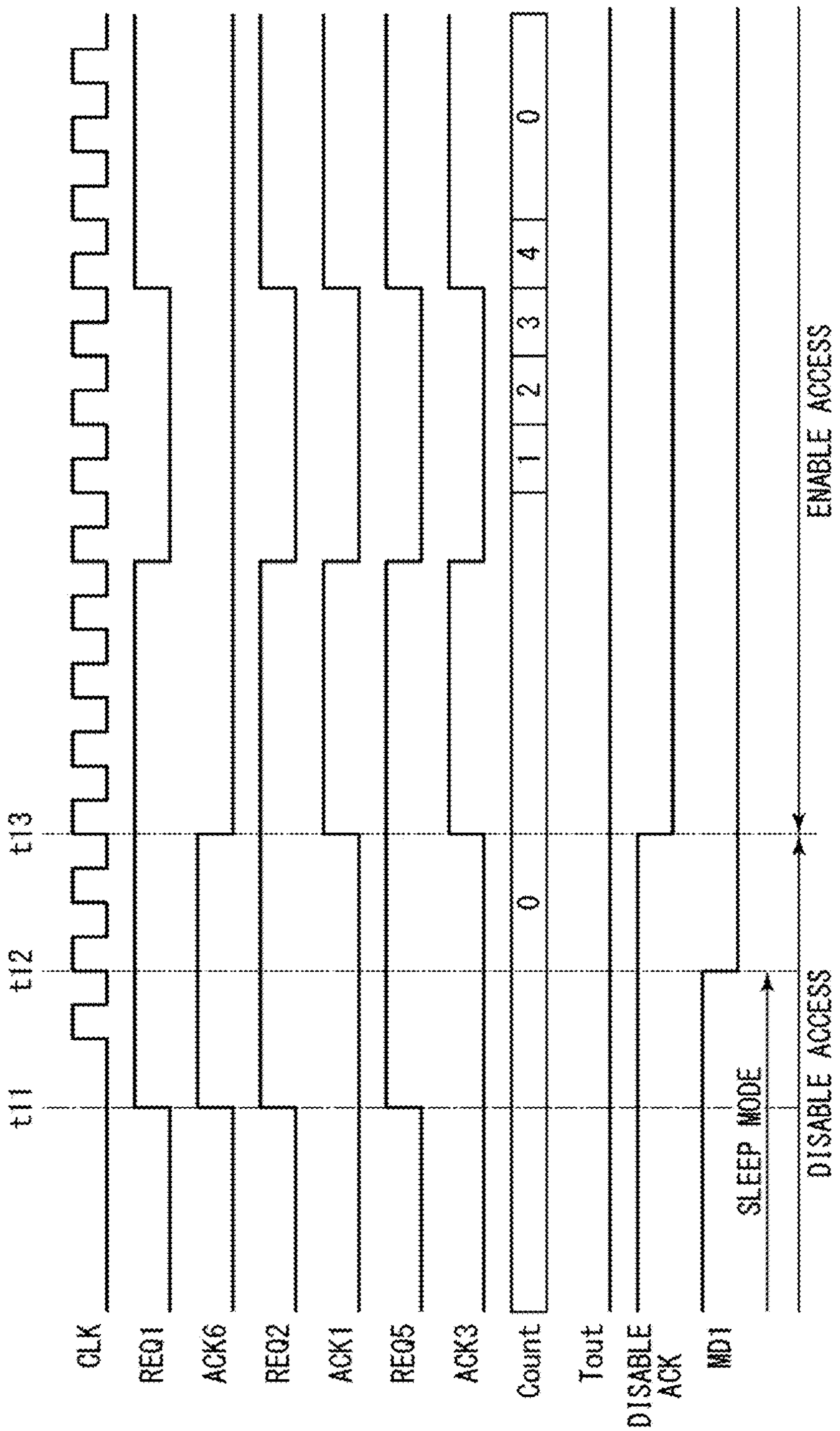
FIG. 3 is a second timing chart illustrating an example of an operation performed by the control device when the first processor requests access to the first storage unit.

FIG. 3 is a second timing chart illustrating an example of an operation performed by the control device 10 in the first case. FIG. 3 illustrates an example of waveforms of the first access request signal REQ1, the sixth acknowledge signal ACK6, the second access request signal REQ2, the first acknowledge signal ACK1, the fifth access request signal REQ5, the third acknowledge signal ACK3, and the first mode switching signal MD1 before and after the operation mode of the first storage unit 51 is switched from the sleep mode to the normal mode.

The clock signal CLK, the count value Count of the timer incorporated in the first memory controller 41, the output signal Tout of the timer, and "DISABLE ACK" are also illustrated in FIG. 3, as in FIG. 2.

As illustrated in FIG. 3, in a period before a time point t11, the first access request signal REQ1, the sixth acknowledge signal ACK6, the second access request signal REQ2, the first acknowledge signal ACK1, the fifth access request signal REQ5, the third acknowledge signal ACK3, and the output signal Tout of the timer are all at low level. On the other hand, the levels of the first mode switching signal MD1 and "DISABLE ACK" are high. Since the level of the first mode switching signal MD1 is high, the first storage unit 51 is under the sleep mode.

At the time point t11, the first processor 11 asserts the first access request signal REQ1. Specifically, at the time point t11, the first processor 11 switches the level of the first access request signal REQ1 from the low level to the high level. In other words, at the time point t11, the first processor 11 issues an access request.

In this case, at the time point t11, the first bus bridge 21 asserts the second access request signal REQ2 in synchronization with the first access request signal REQ1. At the time point t11, the bus arbiter 30 asserts the fifth access request signal REQ5 in synchronization with the second access request signal REQ2.

At the time point t11, since the level of "DISABLE ACK" is high, the first memory controller 41 does no assert the third acknowledge signal ACK3. In this case, at the time point t11, the bus arbiter 30 does not assert the first acknowledge signal ACK1 in synchronization with the third acknowledge signal ACK3. At the time point t11, the first bus bridge 21 outputs a signal indicating the exclusive OR of the first access request signal REQ1 and the first acknowledge signal ACK1 as the sixth acknowledge signal ACK6. As a result, at the time point t11, the level of the sixth acknowledge signal ACK6 is switched from the low level to the high level. In other words, at the time point t11, the first bus bridge 21 asserts the sixth acknowledge signal ACK6.

Subsequently, the first memory controller 41 negates the first mode switching signal MD1 at a time point t12 after a certain period of time after the time point t11. For example, when the first memory 51*a* of the first storage unit 51 is an SRAM, several sequences may be executed to switch the first memory 51*a* from the sleep mode to the normal mode. Therefore, each of the first memories 51*a* of the first storage unit 51 does not immediately transition to the normal mode after the first mode switching signal MD1 is negated.

For example, at a time point t13 after a certain period of time from the time point t12, the sequence ends, and each of the first memories 51*a* of the first storage unit 51 transitions to the normal mode. Since the level of "DISABLE ACK" is switched from the high level to the low level at the time point t13, the first memory controller 41 asserts the third acknowledge signal ACK3 at the time point t13.

In this case, at the time point t13, the bus arbiter 30 asserts the first acknowledge signal ACK1 in synchronization with the third acknowledge signal ACK3. At the time point t13, the first bus bridge 21 outputs a signal indicating the exclusive OR of the first access request signal REQ1 and the first acknowledge signal ACK1 as the sixth acknowledge signal ACK6. As a result, at the time point t13, the level of the sixth acknowledge signal ACK6 is switched from the high level to the low level. In other words, at the time point t13, the first bus bridge 21 negates the sixth acknowledge signal ACK6.

After the time point t13, the operation mode of each of the first memories 51*a* of the first storage unit 51 is the normal mode. Note that a period before the time point t13 is a period in which the first storage unit 51 is inaccessible, and a period after the time point t13 is a period in which the first storage unit 51 is accessible. The operation after the time point t13 is the same as the operation described with reference to FIG. 2.

As described above, upon receiving an access request from the first processor 11 via the bus arbiter 30 in a state where the first storage unit 51 is under the sleep mode, the first memory controller 41 instructs the first storage unit 51 to transition from the sleep mode to the normal mode. More specifically, when the fifth access request signal REQ5 is asserted in a state where the first storage unit 51 is under the sleep mode, the first memory controller 41 negates the first mode switching signal MD1.

After the first storage unit 51 has transitioned to the sleep mode, the first memory controller 41 returns an acknowledgement for the access request from the first processor 11 to the first bus bridge 21 via the bus arbiter 30. More specifically, the first memory controller 41 asserts the third acknowledge signal ACK3 after the first storage unit 51 has transitioned to the sleep mode. When an access request is issued from the first processor 11 and the third acknowledge signal ACK3 is asserted, the bus arbiter 30 asserts the first acknowledge signal ACK1.

The first bus bridge 21 instructs the first processor 11 to stand by until the acknowledgement is received from the bus arbiter 30. Specifically, as illustrated in FIG. 3, the first bus bridge 21 outputs the high-level sixth acknowledge signal ACK6 to the first processor 11 in the period from the time point t11 to time point t13. Thus, the first processor 11 stands by until the sixth acknowledge signal ACK6 is negated without asserting the first data read signal RD1 or the first data write signal WR1 during the period from the time point t11 to the time point t13.

While the example of the operation performed by the control device 10 is described assuming the first case in the present embodiment, the operation performed by the control device 10 in each of the second case, the third case, the fourth case, the fifth case, and the sixth case is also the same as the operation in the first case.

Effects of Embodiment

The control device 10 of the present embodiment includes the first storage unit 51 that requires no refreshing and has volatility, the first processor 11 configured to access the first storage unit 51, the bus arbiter 30 configured to arbitrate an access request from the first processor 11, and the first memory controller 41 configured to perform mode control for the first storage unit 51 based on the access request received from the first processor 11 via the bus arbiter 30. The first memory controller 41 instructs, when a time period during which the access request is not received exceeds a predetermined time period in a state where the first storage unit 51 is under the normal mode, the first storage unit 51 to transition from the normal mode to the sleep mode.

According to the present embodiment as described above, the first memory controller 41 instructs the first storage unit 51 to transition from the normal mode to the sleep mode when a time period during which the access request is not received exceeds a predetermined time period in a state where the first storage unit 51 is under the normal mode. Thus, the first processor 11 needs not to execute processing of determining whether the first storage unit 51 is accessed by another processor, and processing of causing the first storage unit 51 not accessed to transition to the sleep mode. Thus, according to the present embodiment, it is possible to reduce the processing load imposed on the first processor 11 when the first storage unit 51 transitions from the normal mode to the sleep mode.

The control device 10 of the present embodiment further includes the first bus bridge 21 configured to relay communication between the first processor 11 and the bus arbiter 30. When the access request is received in a state where the first storage unit 51 is under the sleep mode, the first memory controller 41 instructs the first storage unit 51 to transition from the sleep mode to the normal mode, and returns an acknowledgement for the access request to the first bus bridge 21 via the bus arbiter 30 after the first storage unit 51 has transitioned to the sleep mode. The first bus bridge 21 instructs the first processor 11 to stand by until the acknowledgement is received from the bus arbiter 30.

According to the present embodiment as described above, when the access request is received in a state where the first storage unit 51 is under the sleep mode, the first memory controller 41 instructs the first storage unit 51 to transition from the sleep mode to the normal mode. Therefore, it is possible to reduce the processing load imposed on the first processor 11 when the first storage unit 51 transition from the sleep mode to the normal mode. After the first storage unit 51 has transitioned to the sleep mode, the first memory controller 41 returns an acknowledgement for the access request to the first bus bridge 21 via the bus arbiter 30, and the first bus bridge 21 instructs the first processor 11 to stand by until the acknowledgement is received from the bus arbiter 30. With this configuration, it is possible to prevent the first processor 11 from accessing the first storage unit 51 until the first storage unit 51 completely switches to the normal mode.

The control device 10 of the present embodiment further includes the second storage unit 52 that requires no refreshing and has volatility, and the second memory controller 42 configured to perform mode control for the second storage unit 52 based on the access request received from the first processor 11 via the bus arbiter 30. The second memory controller 42 instructs, when a time period during which the access request is not received exceeds a predetermined time period in a state where the second storage unit 52 is under the normal mode, the second storage unit 52 to transition from the normal mode to the power saving mode.

According to the present embodiment as described above, the second memory controller 42 instructs the second storage unit 52 to transition from the normal mode to the power saving mode when a time period during which the access request is not received exceeds a predetermined time period in a state where the second storage unit 52 is under the normal mode. Thus, the first processor 11 needs not to execute processing of determining whether the second storage unit 52 is accessed by another processor, and processing of causing the second storage unit 52 not accessed to transition to the sleep mode. Thus, according to the present embodiment, it is possible to reduce the processing load imposed on the first processor 11 when the second storage unit 52 transitions from the normal mode to the sleep mode.

The control device 10 of the present embodiment further includes the first bus bridge 21 configured to relay communication between the first processor 11 and the bus arbiter 30. When the access request is received in a state where the second storage unit 52 is under the sleep mode, the second memory controller 42 instructs the second storage unit 52 to transition from the sleep mode to the normal mode, and returns an acknowledgement for the access request to the first bus bridge 21 via the bus arbiter 30 after the second storage unit 52 has transitioned to the sleep mode. The first bus bridge 21 instructs the first processor 11 to stand by until the acknowledgement is received from the bus arbiter 30.

According to the present embodiment as described above, when the access request is received in a state where the second storage unit 52 is under the sleep mode, the second memory controller 42 instructs the second storage unit 52 to transition from the sleep mode to the normal mode. Therefore, it is possible to reduce the processing load imposed on the first processor 11 when the second storage unit 52 transition from the sleep mode to the normal mode. After the second storage unit 52 has transitioned to the sleep mode, the second memory controller 42 returns an acknowledgement for the access request to the first bus bridge 21 via the bus arbiter 30, and the first bus bridge 21 instructs the first processor 11 to stand by until the acknowledgement is received from the bus arbiter 30. With this configuration, it is possible to prevent the first processor 11 from accessing the second storage unit 52 until the second storage unit 52 completely switches to the normal mode.

Although the embodiments of the present disclosure have been described above, the technical scope of the present disclosure is not limited to the above embodiments, and various changes can be made without departing from the gist of the present disclosure. For example, the followings are possible modified examples.

Figure 4:
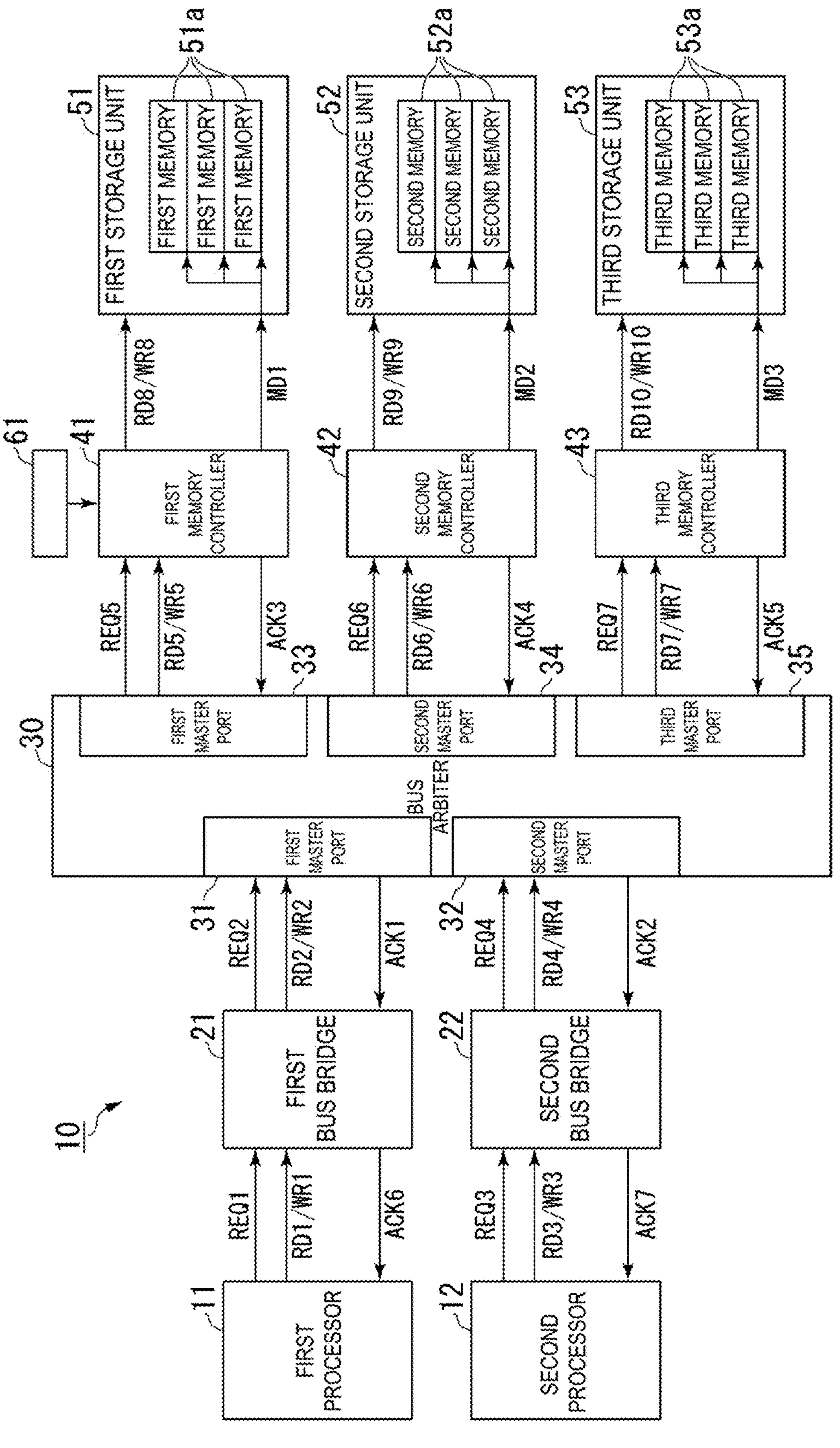
FIG. 4 is a block diagram illustrating a first modified example of the control device.

(1) FIG. 4 is a block diagram illustrating a first modified example of the control device 10. In the embodiment described above, the configuration in which the first memory controller 41 has the function of measuring the time period during which the access request is not received from the first processor 11 is described as an example, but the present disclosure is not limited thereto. For example, as illustrated in FIG. 4, the control device 10 may further include a time measurement circuit 61 that measures the time period during which the access request is not received from the first processor 11. As an example, the time measurement circuit 61 is a timer.

The output signal from the time measurement circuit 61 is input to the first memory controller 41. The time measurement circuit 61 starts a count operation when the fifth access request signal REQ5 is negated. In other words, the time measurement circuit 61 starts the count operation when the access request disappears. The time measurement circuit 61 counts up the count value in synchronization with the rising edge of the clock signal CLK. The time measurement circuit 61 asserts the output signal when the count value is counted up to “7”.

Figure 5:
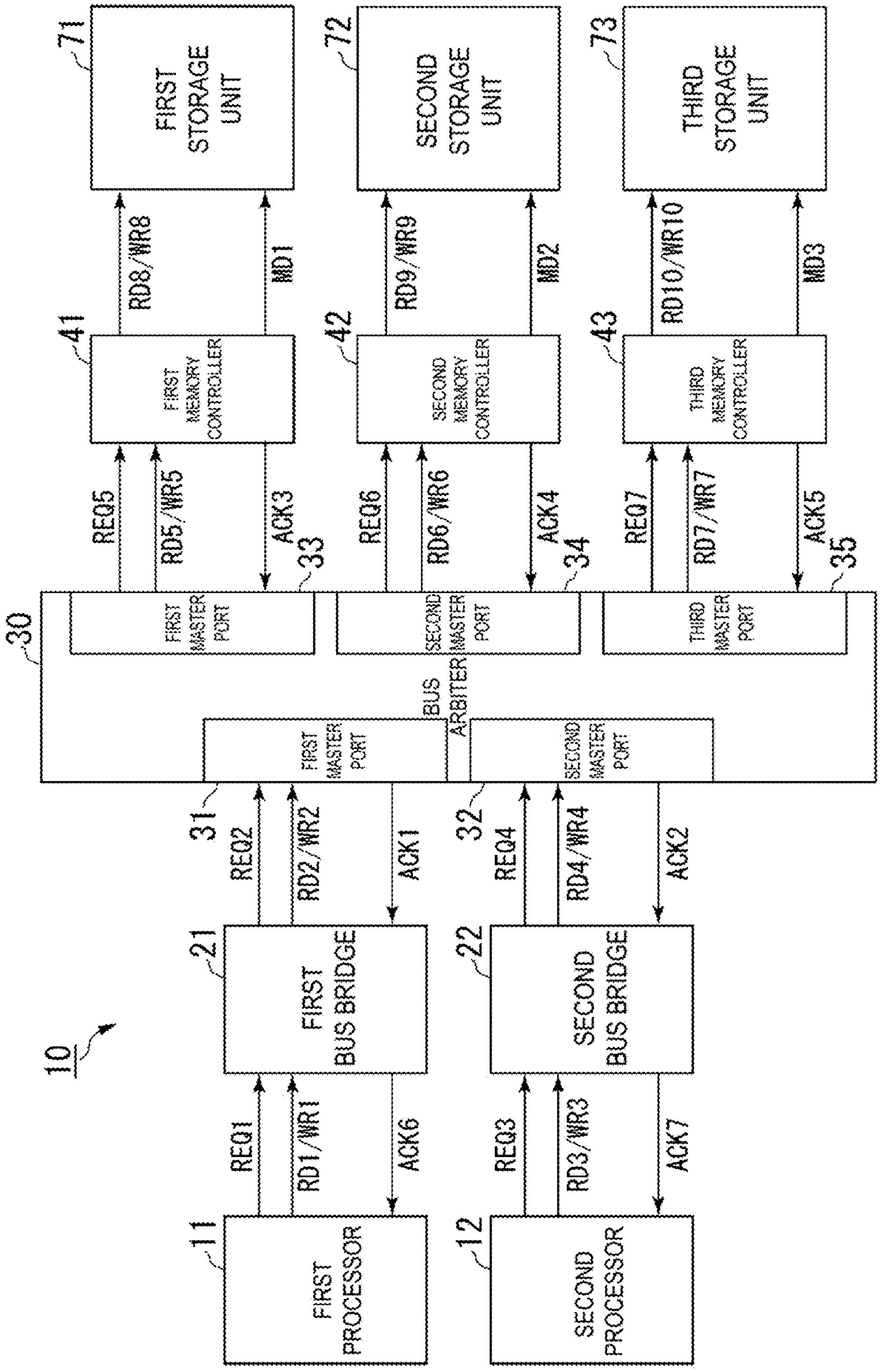
FIG. 5 is a block diagram illustrating a second modified example of the control device.

(2) FIG. 5 is a block diagram illustrating a second modified example of the control device 10. In the above-described embodiment, an example is described where the first storage unit 51, the second storage unit 52, and the third storage unit 53 are each a memory bank including a plurality of memories that require no refreshing and have volatility. However, the present disclosure is not limited thereto. For example, as illustrated in FIG. 5, the control device 10 may include a first storage unit 71, a second storage unit 72, and a third storage unit 73 instead of the first storage unit 51, the second storage unit 52, and the third storage unit 53. Each of the first storage unit 71, the second storage unit 72, and the third storage unit 73 is a single memory that requires no refreshing and has volatility. For example, each of the first storage unit 71, the second storage unit 72, and the third storage unit 73 is an SRAM.

(3) In the above-described embodiment, the control device 10 including the two processors that are the first processor 11 and the second processor 12 is described as an example, but the number of processors is not limited to two. In the above-described embodiment, the control device 10 including the three storage units that are the first storage unit 51, the second storage unit 52, and the third storage unit 53 is described as an example, but the number of storage units is not limited to three. The number of memory controllers (control circuits) may be the same as the number of storage units, and the number of bus bridges may be the same as the number of processors.

(4) In the above-described embodiment, the control device 10 including the first bus bridge 21 and the second bus bridge 22 is described as an example. However, the control device 10 may not necessarily include the first bus bridge 21 and the second bus bridge 22. In this case, each of the first processor 11 and the second processor 12 may directly communicate with the bus arbiter 30.

Overview of Present Disclosure

An overview of the present disclosure is provided below as the appendices.

APPENDIX 1

A control device including: a first storage unit that requires no refreshing and has volatility, a first processor configured to access the first storage unit, a bus arbiter configured to arbitrate an access request from the first processor, and a first control circuit configured to perform mode control for the first storage unit based on the access request received from the first processor via the bus arbiter, wherein the first control circuit instructs, when a time period during which the access request is not received exceeds a predetermined time period in a state where the first storage unit is under a normal mode, the first storage unit to transition from the normal mode to a power saving mode.

According to the control device described in Appendix 1, the first control circuit instructs the first storage unit to transition from the normal mode to the power saving mode when a time period during which the access request is not received exceeds a predetermined time period in a state where the first storage unit is under the normal mode. Thus, the first processor needs not to execute processing of determining whether the first storage unit is accessed by another processor, and processing of causing the first storage unit not accessed to transition to the power saving mode. Therefore, according to the control device described in Appendix 1, it is possible to reduce the processing load imposed on the first processor when the first storage unit transitions from the normal mode to the power saving mode.

APPENDIX 2

The control device according to Appendix 1, further including a first bus bridge configured to relay communication between the first processor and the bus arbiter, wherein when the access request is received in a state where the first storage unit is under the power saving mode, the first control circuit instructs the first storage unit to transition from the power saving mode to the normal mode, and returns an acknowledgement for the access request to the first bus bridge via the bus arbiter after the first storage unit has transitioned to the power saving mode, and the first bus bridge instructs the first processor to stand by until the acknowledgement is received from the bus arbiter.

According to the control device described in Appendix 2, the first control circuit instructs the first storage unit to transition from the power saving mode to the normal mode when the access request is received in a state where the first storage unit is under the power saving mode. Thus, it is possible to reduce the processing load imposed on the first processor when the first storage unit transitions from the power saving mode to the normal mode. After the first storage unit has transitioned to the power saving mode, the first control circuit returns an acknowledgement for the access request to the first bus bridge via the bus arbiter, and the first bus bridge instructs the first processor to stand by until the acknowledgement is received from the bus arbiter. With this configuration, it is possible to prevent the first processor from accessing the first storage unit the first storage unit completely switches to the normal mode.

APPENDIX 3

The control device according to Appendix 1 or 2, wherein the first control circuit measures a time period during which the access request is not received.

APPENDIX 4

The control device according to Appendix 1 or 2, further including a time measurement circuit configured to measure a time period during which the access request is not received.

APPENDIX 5

The control device according to Appendix 1, further including: a second storage unit that requires no refreshing and has volatility, and a second control circuit configured to perform mode control for the second storage unit based on the access request received from the first processor via the bus arbiter, wherein the second control circuit instructs, when a time period during which the access request is not received exceeds a predetermined time period in a state where the second storage unit is under a normal mode, the second storage unit to transition from the normal mode to the power saving mode.

According to the control device described in Appendix 5, the second control circuit instructs the second storage unit to transition from the normal mode to the power saving mode when the time period during which the access request is not received exceeds a predetermined time period in a state where the second storage unit is under the normal mode. Thus, the first processor needs not to execute processing of determining whether the second storage unit is accessed by another processor, and processing of causing the second storage unit not accessed to transition to the power saving mode. Therefore, according to the control device described in Appendix 5, it is possible to reduce the processing load imposed on the first processor when the second storage unit transitions from the normal mode to the power saving mode.

APPENDIX 6

The control device according to Appendix 5, further including a first bus bridge configured to relay communication between the first processor and the bus arbiter, wherein when the access request is received in a state where the second storage unit is under the power saving mode, the second control circuit instructs the second storage unit to transition from the power saving mode to the normal mode, and returns an acknowledgement for the access request to the first bus bridge via the bus arbiter after the second storage unit has transitioned to the power saving mode, and the first bus bridge instructs the first processor to stand by until the acknowledgement is received from the bus arbiter.

According to the control device described in Appendix 6, the second control circuit instructs the second storage unit to transition from the power saving mode to the normal mode when the access request is received in a state where the second storage unit is under the power saving mode. Thus, it is possible to reduce the processing load imposed on the first processor when the second storage unit transitions from the power saving mode to the normal mode. After the second storage unit has transitioned to the power saving mode, the second control circuit returns an acknowledgement for the access request to the first bus bridge via the bus arbiter, and the first bus bridge instructs the first processor to stand by until the acknowledgement is received from the bus arbiter. With this configuration, it is possible to prevent the second processor from accessing the second storage unit until the second storage unit completely switches to the normal mode.

APPENDIX 7

The control device according to Appendix 5 or 6, wherein each of the first storage unit and the second storage unit is a memory bank including a plurality of memories that require no refreshing and have volatility.

APPENDIX 8

The control device according to Appendix 5 or 6, wherein each of the first storage unit and the second storage unit is a single memory that requires no refreshing and has volatility.

What is claimed is:

1. A control device comprising:

a first storage unit that requires no refreshing and has volatility;

a first processor configured to access the first storage unit;

a bus arbiter configured to arbitrate an access request from the first processor; and a first control circuit configured to perform mode control for the first storage unit based on the access request received from the first processor via the bus arbiter; and a first bus bridge configured to relay communication between the first processor and the bus arbiter, wherein the first control circuit instructs, when a time period during which the access request is not received exceeds a predetermined time period in a state where the first storage unit is under a normal mode, the first storage unit to transition from the normal mode to a power saving mode, when the access request is received in a state where the first storage unit is under the power saving mode, the first control circuit instructs the first storage unit to transition from the power saving mode to the normal mode, and returns an acknowledgement for the access request to the first bus bridge via the bus arbiter after the first storage unit transitions to the power saving mode, and the first bus bridge instructs the first processor to stand by until the acknowledgement is received from the bus arbiter.

2. The control device according to claim 1, wherein the first control circuit measures a time period during which the access request is not received.

3. The control device according to claim 1, further comprising a time measurement circuit configured to measure a time period during which the access request is not received.

4. The control device according to claim 1, further comprising:

a second storage unit that requires no refreshing and has volatility; and a second control circuit configured to perform mode control for the second storage unit based on the access request received from the first processor via the bus arbiter, wherein the second control circuit instructs, when a time period during which the access request is not received exceeds a predetermined time period in a state where the second storage unit is under a normal mode, the second storage unit to transition from the normal mode to the power saving mode.

5. The control device according to claim 4, further comprising a first bus bridge configured to relay communication between the first processor and the bus arbiter, wherein when the access request is received in a state where the second storage unit is under the power saving mode, the second control circuit instructs the second storage unit to transition from the power saving mode to the normal mode, and returns an acknowledgement for the access request to the first bus bridge via the bus arbiter after the second storage unit transitions to the power saving mode, and the first bus bridge instructs the first processor to stand by until the acknowledgement is received from the bus arbiter.

6. The control device according to claim 4, wherein each of the first storage unit and the second storage unit is a memory bank including a plurality of memories that require no refreshing and have volatility.

7. The control device according to claim 4, wherein each of the first storage unit and the second storage unit is a single memory that requires no refreshing and has volatility.

* * * * *